April 14, 1931.  T. A. ROBLEY  1,800,906

ELECTROMAGNETICALLY OPERABLE MECHANISM

Filed Oct. 3, 1929

INVENTOR.
THOMAS A. ROBLEY
BY Ely N Barrow
ATTORNEYS

Patented Apr. 14, 1931

1,800,906

UNITED STATES PATENT OFFICE

THOMAS A. ROBLEY, OF HUNTINGTON PARK, CALIFORNIA

ELECTROMAGNETICALLY-OPERABLE MECHANISM

Application filed October 3, 1929. Serial No. 397,033.

This invention relates to magnetically operable mechanical devices.

The general purpose of the invention is to provide magnetically operable mechanical devices in which magnetic action is utilized to secure rotary or angular or sectional movement of an element directly to any predetermined extent without the use of intermediate mechanical connections, such rotary or angular or sectional movement being capable of utilization to operate numerous mechanisms, for example, brakes.

More particularly, the invention has for an object, the provision of an improved magnetically operated brake.

The foregoing and other purposes or objects of the invention are attained in the device disclosed in the accompanying drawings and this specification, it being understood that the particular form of the invention and its particular application to brakes are disclosed by way of example only, and the invention in its broadest aspects is not limited to the specific forms and application shown.

Of the accompanying drawings.

Figure 1:
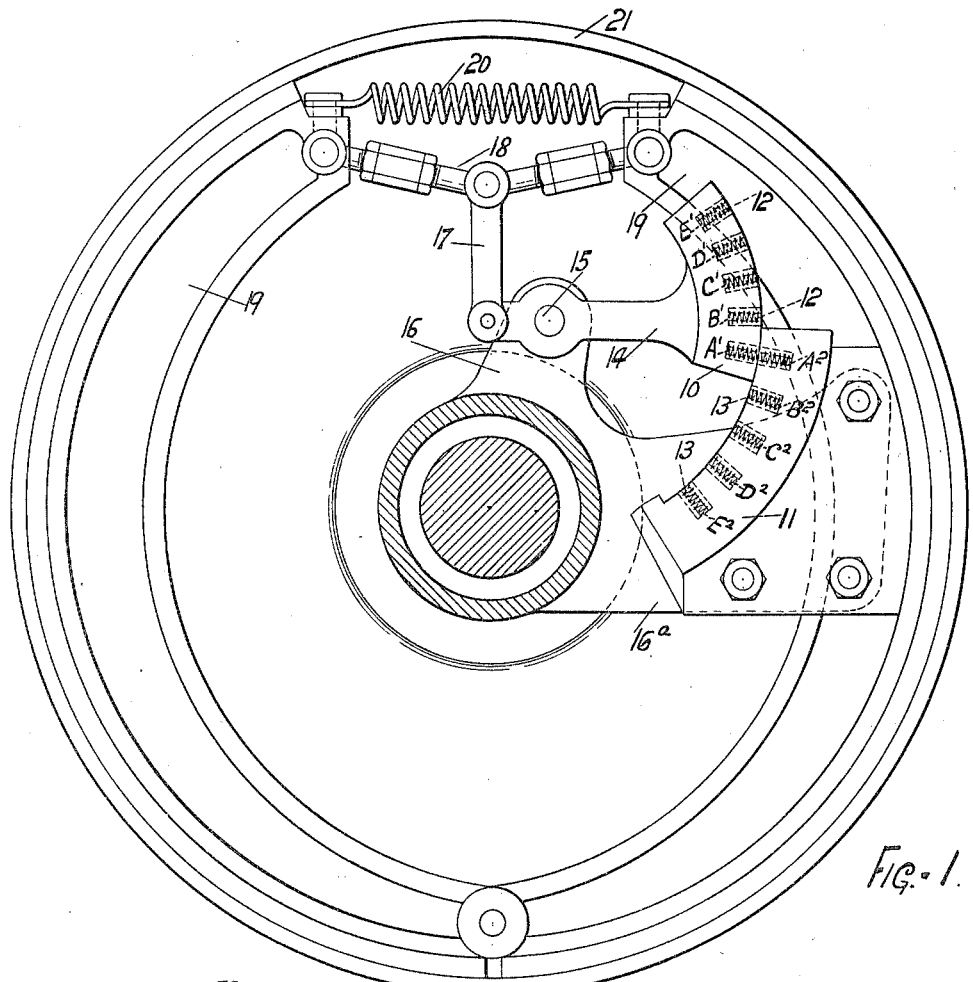
Figure 1 is an elevation of a brake embodying the invention.

Referring to the drawings, the numerals 10 and 11 represent respectively relatively movable concentric sectors, one of which, sector 10, may be movable and the other of which, sector 11, may be fixed. These sectors are each provided with a plurality of electromagnets numbered 12, 12 and 13, 13 in the respective sectors, the magnets 12 in section 10 being lettered $A^1$, $B^1$, $C^1$, $D^1$, and $E^1$ and the corresponding magnets in sector 11 being lettered $A^2$, $B^2$, $C^2$, $D^2$, and $E^2$, the magnets in the respective sectors being so wound as to be energized in the same directions relatively of the coils, whereby the north pole in one set will be inwardly thereof and the south pole of the other set will be outwardly thereof.

The sector 10 is shown on a lever 14 pivoted at 15 on the hub or spider 16 of a brake structure, the lever 14 being connected by a link 17 to a toggle 18 for expanding brake shoes 19, 19 which may be normally held contracted by a spring 20 out of contact with a brake drum 21.

The sector 11 may be mounted fixedly on an arm $16^a$ of the spider 16.

Figure 2:
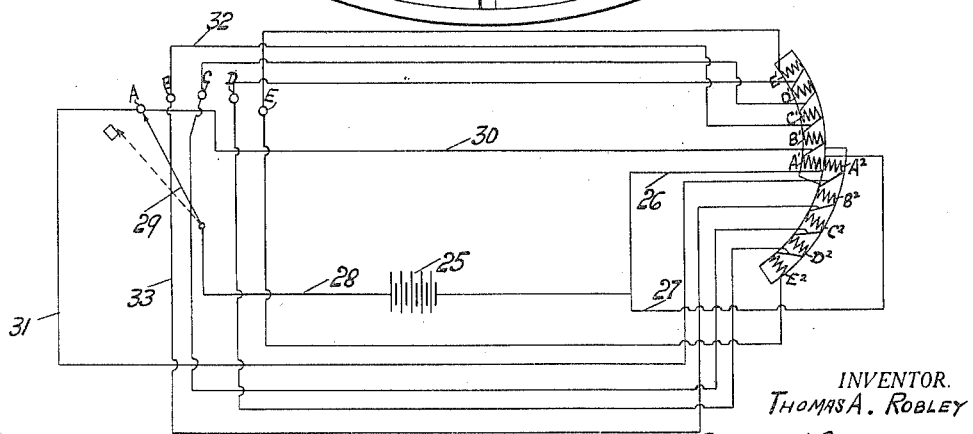
Figure 2 is a wiring diagram illustrating one way in which said brake may be arranged in a circuit for effective operation.

The sets of magnets 12 and 13 may be arranged to be energized in various ways, any part of one set and any part of the other set being energized to secure any degree of movement or power application. One suitable way for connecting up the magnets for effective brake operation is illustrated diagrammatically in Figure 2.

A source of power such as a battery 25 is connected from one terminal by leads 26 and 27 respectively to the extreme ends of electromagnets $A^1$ and $A^2$ respectively, and from the other terminal by a lead 28 to a controller 29 having thereon points A, B, C, D and E corresponding to the electromagnets $A^1$, $A^2$, $B^1$, $B^2$, $C^1$, $C^2$, $D^1$, $D^2$, and $E^1$, $E^2$. Coils $A^1$ to $E^1$ may be connected in series and also coils $A^2$ to $E^2$ may be connected in series. In this case point A is tapped in between coils $A^1$ and $B^1$ and between coils $A^2$ and $B^2$ respectively by leads 30 and 31; point B is tapped in between coils $B^1$ and $C^1$ and between coils $B^2$ and $C^2$ respectively by leads 32 and 33 and the remainder of the points C to E on the controller are correspondingly tapped in between their corresponding coils or magnets and a succeeding coil or magnet, except in the case of point E which is connected with the extreme ends of coils $E^1$ and $E^2$ as shown.

It will be obvious that the coils can be adapted to be connected in parallel or multiple relation if a stronger pulling action is desired. The manner in which the coils are connected depends on the particular application of the apparatus.

In the operation of this particular embodiment of the invention, the desired degree of rotative movement and the desired power to be applied to the brakes is secured by actuating controller 29 to establish the circuit through more or less of the sets of coils $A^1$, $A^2$, $B^1$, $B^2$, etc., setting up fields of radial lines of force in the magnets which cause the sectors 10 and 11 to move relatively to each other, more or less depending upon the number of sets energized, due to the action of the fields which try to line up so as to become equalized.

It is thus evident that the operator can easily and accurately control the time and extent of relative movement between the parts.

When the magnets are deenergized, the spring 20 contracts the brake and swings the sector 10 to its initial position.

It will appear from the foregoing that a simple effective electromagnetically operating mechanism has been provided which is capable of effective use in many different types of apparatus and that an improved brake utilizing such device has been devised. Obviously, modifications of this invention and other applications therefor may be resorted to without departing from the spirit of the invention or the scope of the appended claims.

What is claimed is:

1. A brake including a drum, an expanding brake movable against the drum, yielding means normally holding the brake contracted, means for expanding the brake comprising a toggle, a lever for operating the toggle, a link between one end of the lever and the toggle, an electromagnetic device for actuating the lever including a sector on the lever, having arranged therein a plurality of electromagnets and a cooperating fixed sector having arranged therein a plurality of electromagnets, and means for energizing one or more electromagnets of each sector to cause said sectors to swing relative to each other to the desired extent to operate said brake.

2. A brake including a drum, a brake movable against the drum, yielding means normally holding the brake out of engagement with the drum, means for actuating the brake comprising an electromagnetic device including a sector having arranged therein a plurality of electromagnets and a cooperating sector having arranged therein a plurality of electromagnets, and means for energizing one or more electromagnets of each sector to cause said sectors to swing relative to each other to the desired extent to operate said brake.

THOMAS A. ROBLEY.